No. 685,701. Patented Oct. 29, 1901.
J. WARRINGTON.
GRAIN HEATER.
(Application filed Sept. 24, 1900.)
(No Model.) 2 Sheets—Sheet 2.

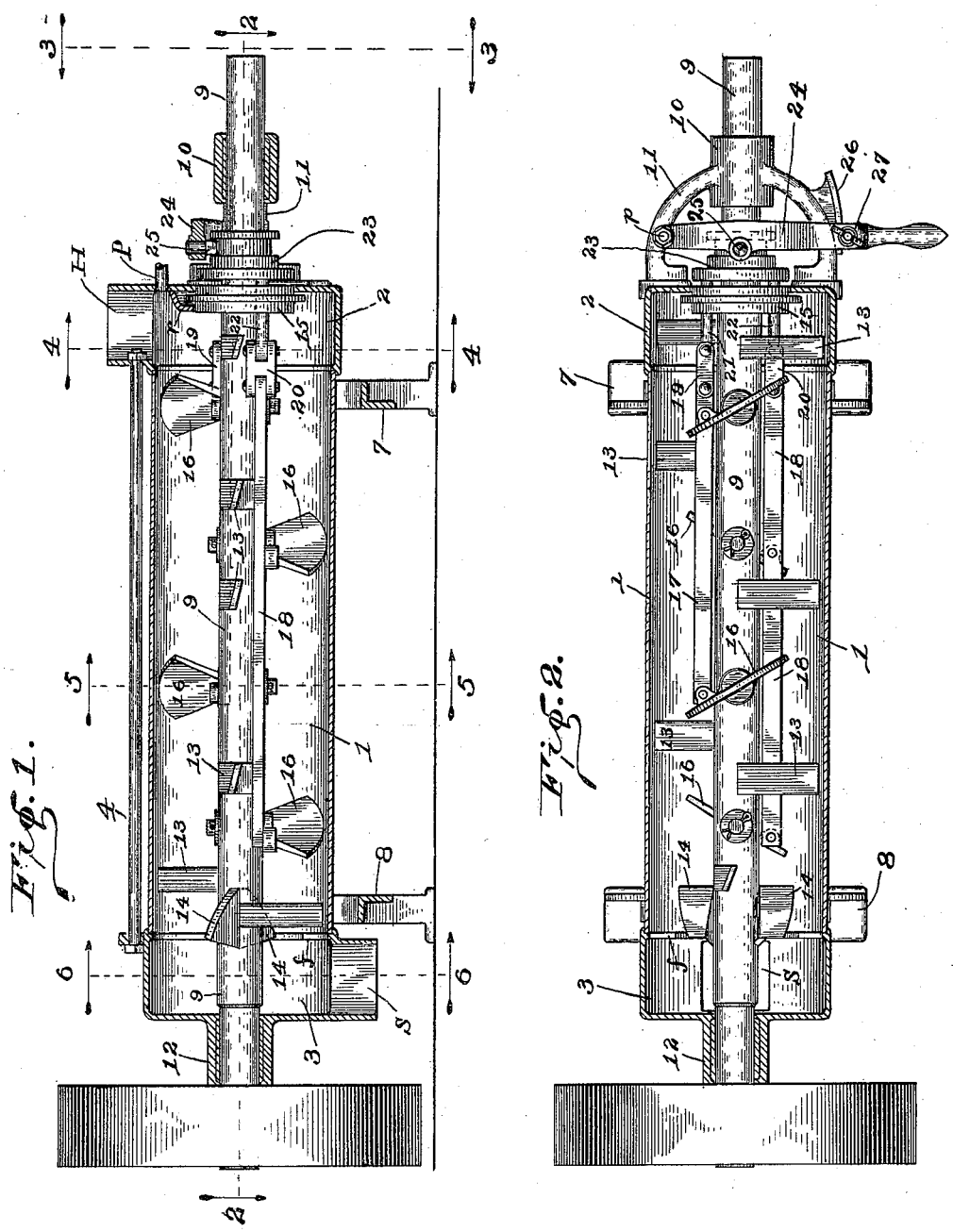

WITNESSES:
C. S. Frye.
J. A. Walsh.

INVENTOR.
Jesse Warrington,
BY
Chester Bradford
ATTORNEY.

UNITED STATES PATENT OFFICE.

JESSE WARRINGTON, OF INDIANAPOLIS, INDIANA, ASSIGNOR OF ONE-HALF TO NORDYKE & MARMON COMPANY, OF INDIANAPOLIS, INDIANA, A CORPORATION OF INDIANA.

GRAIN-HEATER.

SPECIFICATION forming part of Letters Patent No. 685,701, dated October 29, 1901.

Application filed September 24, 1900. Serial No. 30,904. (No model.)

*To all whom it may concern:*

Be it known that I, JESSE WARRINGTON, a citizen of the United States, residing at Indianapolis, in the county of Marion and State of Indiana, have invented certain new and useful Improvements in Grain-Heaters, of which the following is a specification.

My present invention relates to that class of apparatus by which grain is steamed and heated somewhat before being ground, the object being to put such grain in the best condition for reduction to flour and other mill products.

Said invention consists in a machine for the purpose wherein the conveyer-flights are adjustable, so that the grain may be driven through the machine more or less rapidly, and thus subjected to its action for a shorter or longer time, as the necessities of the case require.

A machine embodying said invention will be first fully described and the novel features thereof then pointed out in the claims.

Figure 3:
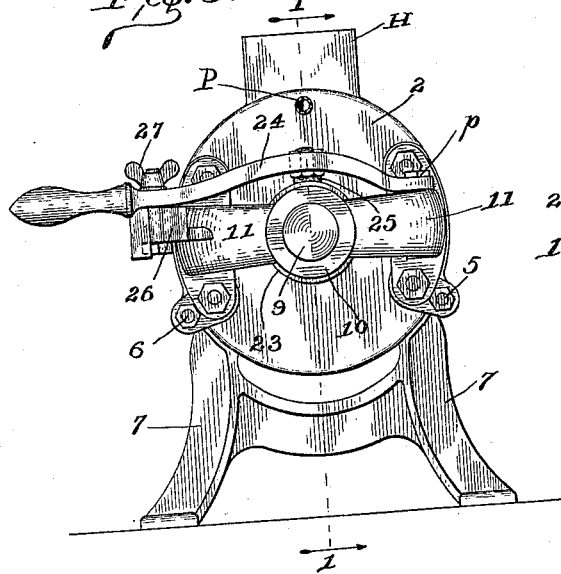
Figure 4:
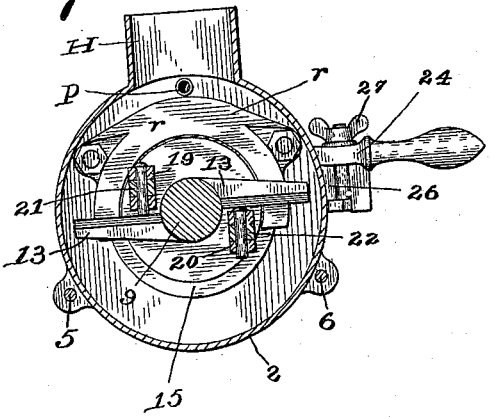
Figure 5:
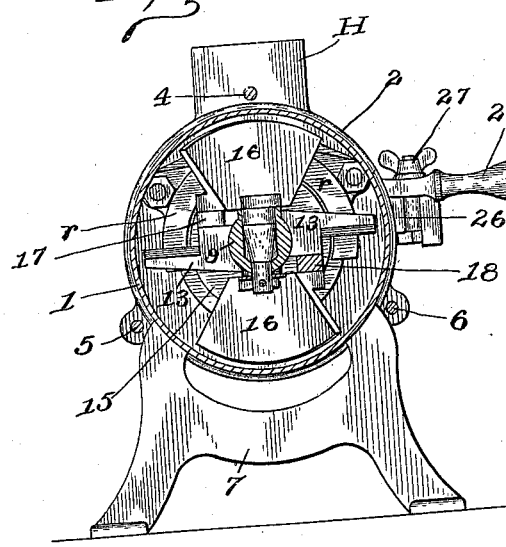

Referring to the accompanying drawings, which are made a part hereof and on which similar reference characters indicate similar parts, Figure 1 is a central longitudinal vertical sectional view of a machine embodying my invention as seen when looking in the direction indicated by the arrows from the dotted line 1 1 in Fig. 3; Fig. 2, a horizontal sectional view as seen when looking downwardly from the dotted line 2 2 in Fig. 1; Fig. 3, an end elevation of the head end of the machine; and Figs. 4, 5, and 6, transverse vertical sectional views as seen when looking in the direction indicated by the arrows from the dotted lines 4 4, 5 5, and 6 6, respectively, in Fig. 1.

The body of the machine consists of a central cylindrical part 1, a head end 2, and a foot end 3. These parts are usually held together when assembled by tie-rods 4, 5, and 6, and said body structure is generally provided with the feet 7 and 8. A central shaft 9 passes through the machine, having a bearing 10 at the head end of the machine, which is carried by an arched frame-piece 11, and a bearing 12 at the foot end of the machine, which I have shown as a hub extending out from and formed in piece with the end part 3.

The shaft 9 is formed with a series of projections 13, which serve as stirring-fingers and keep the grain well agitated as it is passing through the machine, and also with wings 14 at about the point where the grain is delivered from the cylindrical body into the foot, which, in connection with a flange *f* in said foot, serve to prevent the grain from being discharged too rapidly. At the head end of the machine this shaft is provided with a circular flange or plate 15, (which may be and usually is cast in piece therewith,) and which serves as a bearing for the flight-operating rods, which will be presently described, and to close the opening which would otherwise exist in said head end.

The grain is driven through the machine by a number of conveyer-flights 16, which are pivotally mounted in bearings in the shaft 9, said bearings being generally transverse holes drilled through said shaft. I have shown four of these pivoted flights; but obviously any number desired, greater or less, may be employed. The inclination of these flights is designed to be varied as the rapidity of motion of the grain through the machine is desired to be increased or diminished. A part of said flights are upon one side of the shaft and a part upon the other. Those upon one side are pivoted to the operating-rod 17 and those upon the other side to the operating-rod 18, which rods extend parallel with the shaft 9 to a point near the head end of the machine, where they are coupled, by means of links 19 and 20 and short plunger-rods 21 and 22, to a sliding collar 23, mounted loosely on the shaft 9 outside the head end of the machine. The lever 24 is pivoted (as by a pivot *p*) at one side of the arched frame-piece 11 and extends across over said collar 23 and is provided with a handle upon the projecting end. At the point where it passes the collar 23 it carries a projection 25, which extends into a circumferential groove in said collar, so that the collar and the parts attached thereto may be moved longitudinally of the shaft by swinging the lever 24. A quadrant 26 is formed on the arched frame-piece 11 adjacent to the path of the lever 24, and said lever is provided with a clamp-screw 27, which is adapted to engage with said quadrant, so that the lever and the quadrant may be clamped firmly together in any adjusted position desired.

Figure 6:
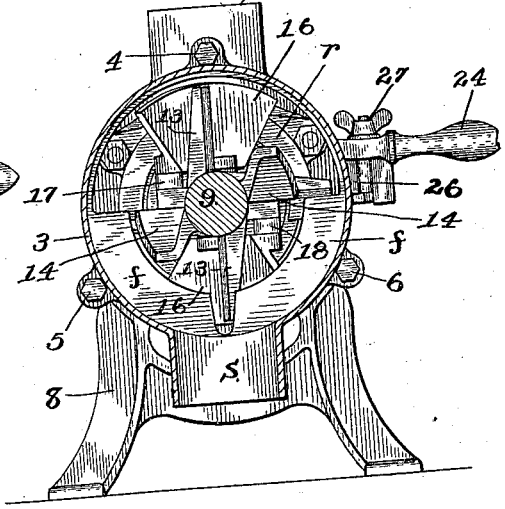

The grain is introduced into the machine through a hopper H, which is, as generally formed, an extension on the upper side of the head-casting 2, and is discharged through a delivery-spout S, which is usually a downward extension on the under side of the foot-casting 3. A steam-pipe P enters the hopper H below the point where the grain is introduced thereinto and furnishes the heat and steam required. The grain is driven with more or less rapidity (according to how the conveyer-flights are adjusted) through the machine from the hopper H to the delivery-spout S, whence it passes off for further manipulation. The passage into the end 3, as has already been stated, is retarded by means of the flange $f$ therein. This flange $f$, however, has a central slit $z$, comparatively narrow in width, extending to the bottom in the middle, so that all the grain may be driven out by the conveyer at the end of the operation, as is best shown in Fig. 6. In order to prevent the grain from passing out through the opening in the head end of the machine, a roof-piece $r$ is secured within the casting 2 just below the hopper H and which extends out over a suitable flange on the plate 15, which, as above described, is carried by or formed in piece with the shaft as a support for the plungers operating the flight-controlling rods.

Having thus fully described my said invention, what I claim as new, and desire to secure by Letters Patent, is—

1. The combination, in a grain-heater, of a cylindrical body having an ingress-hopper and an egress-opening, a shaft extending horizontally through said heater-body, stirring-arms fixedly mounted on said shaft, conveyer-flights pivoted on said shaft at intervals between said stirring-arms, a bar connecting said flights, an operating-lever on the outside, and means connecting said bar with said lever, substantially as set forth.

2. The combination, in a grain-heater, of a cylindrical body having an ingress-hopper and an egress-opening, a shaft extending horizontally through said body, pivoted conveyer-flights on said shaft, operating-rods connected to said conveyer-flights, and a lever outside the machine connected to said rods whereby the same may be operated, substantially as set forth.

3. The combination, in a grain-heater, of the stationary body having an ingress-hopper and an egress-opening, and a shaft provided with conveyer-flights extending through said body, the foot end of said body being provided near the discharging-point with a retarding-flange, $f$, over which the grain is discharged, whereby the grain is prevented from being discharged too rapidly, which flange has a central slit $z$ extending below the main discharging-point through which the last portion of the charge of grain may be discharged at the end of any individual operation, substantially as shown and described.

4. The combination, in a grain-heater, of a cylindrical body having an ingress-hopper and a discharge-opening, a shaft extending through said body carrying conveyer-flights and also carrying a circular plate next the head and below the hopper, and said body being provided with a roof-piece, $r$, extending over said circular plate, substantially as shown and described.

5. The combination, in a grain-heater, of a cylindrical body having an ingress-hopper on the upper side of the head end, and a discharge-opening on the lower side of the foot end, a horizontal shaft extending through said body and bearing a circular plate and adjustable conveyer-flights, rods pivoted to said flights and connected to plunger-rods passing through said plate, a collar loosely mounted on the shaft outside the head of the machine to which said plunger-rods are connected, said collar being provided with a circumferential groove, and a lever pivoted to the framework and provided with a projection which enters said circumferential groove, whereby the conveyer-flights may be adjusted while the machine is running, substantially as set forth.

6. The combination, in a grain-heater, of a cylindrical body having an ingress-hopper and a discharge-opening, a steam-supply pipe, a shaft mounted in the heads of said cylindrical body and carrying stirring-fingers and adjustable conveyer-flights, and means connecting together said conveyer-flights for adjusting them whereby the travel of the grain through the heater may be accelerated or retarded and the action of the steam thereon thus diminished or increased, substantially as set forth.

7. The combination, in a grain-heater, of the body, a shaft extending through the body, conveyer-flights pivoted to the shaft, a circular plate carried by the shaft at the extreme head end of the body, rods connected to the pivoted conveyer-flights, a collar on the shaft outside the body having circumferential grooves therein, connections extending from said collar through the plate on the shaft to the pivoted conveyer-flights, and a lever secured to the frame of the machine and provided with an engaging point adapted to engage with said circumferential groove, whereby said collar may be moved longitudinally of the shaft and the inclination of the conveyer-flights thus increased or diminished.

In witness whereof I have hereunto set my hand and seal, at Indianapolis, Indiana, this 14th day of September, A. D. 1900.

JESSE WARRINGTON. [L. S.]

Witnesses:
CHESTER BRADFORD,
JAMES A. WALSH.